US 6,707,504 B2

(12) United States Patent
Chung (10) Patent No.: US 6,707,504 B2
(45) Date of Patent: Mar. 16, 2004

(54) CAPTION DISPLAY METHOD OF DIGITAL TELEVISION

(75) Inventor: Jung Oh Chung, Seoul (KR)

(73) Assignee: LG Electronics Inc., Seoul (KR)

( * ) Notice: Subject to any disclaimer, the term of this patent is extended or adjusted under 35 U.S.C. 154(b) by 400 days.

(21) Appl. No.: 09/767,882

(22) Filed: Jan. 24, 2001

(65) Prior Publication Data

US 2001/0009445 A1 Jul. 26, 2001

(30) Foreign Application Priority Data

Jan. 24, 2000 (KR) .......................................... 2000-3209

(51) Int. Cl.⁷ ................................................. H04N 5/50
(52) U.S. Cl. ...................... 348/569; 348/569; 348/556; 725/39
(58) Field of Search ................................ 348/563, 564, 348/569, 468, 465, 553, 576, 556; 725/39, 44

(56) References Cited

U.S. PATENT DOCUMENTS 6,067,653 A * 5/2000 Tsukagoshi .................. 714/746
6,516,467 B1 * 2/2003 Schindler et al. ........... 725/153

* cited by examiner

Primary Examiner—Victor R. Kostak
(74) Attorney, Agent, or Firm—Birch, Stewart, Kolasch & Birch, LLP (57) ABSTRACT

The present invention relates to a caption display method of a digital television which is capable of displaying a caption having a certain size and a font on an appropriate position of a picture having 16:9 picture ratio when a picture having 4:3 picture ratio or a picture having 16:9 picture ratio enlarged from the picture having 4:3 picture ratio is displayed on a screen of a digital television having 16:9 picture ratio. The caption display method of the digital television in accordance with the present invention for displaying a picture with a caption by receiving picture transmission stream transmitted from a broadcast station on a screen of a DTV having a certain picture ratio comprises a judging process for judging whether a caption descriptor is included in program guide information transmitted with the picture transmission stream, an adjusting process for adjusting automatically font and/or position of a caption to be displayed with a picture of the received picture transmission stream in order to be displayed corresponding to the picture ratio of the screen in accordance with the information included in a caption descriptor when there is the caption descriptor, and a displaying process for displaying a caption having the adjusted font on the adjusted position with the picture.

19 Claims, 8 Drawing Sheets

CAPTION DISPLAY METHOD OF DIGITAL TELEVISION

BACKGROUND OF THE INVENTION

1. Field of the Invention

The present invention relates to a caption display method of a DTV (Digital Television), in particular to a caption display method of a DTV which is capable of displaying a caption having a certain size and a font on an appropriate position of a picture having 16:9 picture ratio when the picture having 4:3 picture ratio or enlarged 16:9 picture ratio is displayed on a screen of the digital television having 16:9 picture ratio.

2. Description of the Prior Art

Recently, according to realization of a digital television a broadcast station sends out a digital broadcast program for digital broadcasting and a converted digital broadcast program which is converted from an analog broadcast program on the air, and a digital television receives the digital broadcast programs and displays them.

Broadcast data corresponding to the digital broadcast program broadcasted from the broadcast station comprises picture data and broadcast program information. When the broadcast program information comprises caption information related to caption data, a DTV displays appropriately the caption on a screen with the picture. Herein, the caption information means a caption descriptor.

Figure 1:
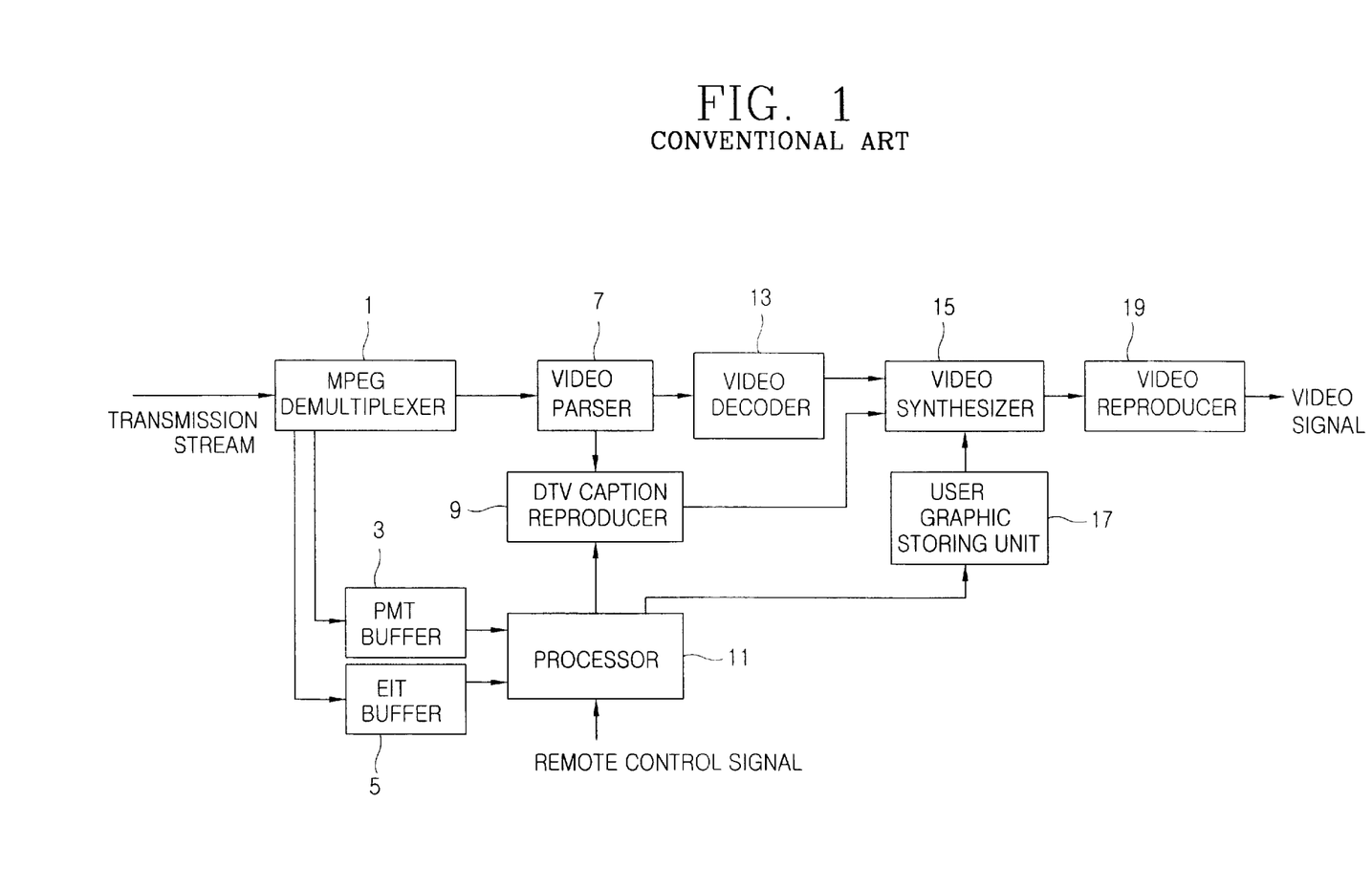
FIG. 1 is a construction profile illustrating a general caption processing apparatus.

FIG. 1 is a construction profile illustrating a general caption display apparatus. It comprises a MPEG demultiplexer 1 of a DTV for outputting information related to video data and a broadcast program, namely, a packet including a PMT (Program Mapping Table) and an EIT (Event Information Table) by being inputted a MPEG-2 transmission stream and demultiplexing it when the DTV receives the MPEG-2 transmission stream transmitted from the broadcast station, a PMT buffer 3 and an EIT buffer 5 for storing the PMT packet and EIT packet separately after being inputted, a processor 11 for outputting a caption request select signal and a screen control signal when there is a caption output request after being inputted the caption descriptor information included in the PMT and EIT stored in the PMT buffer 3 and EIT buffer 5, for receiving a user order signal from a user input unit (not shown) such as a remote controller etc., and for judging whether there is the caption output request in the user order signal, a user graphic storing unit 17 for making a user select more detailed caption menu by outputting GUI picture information by receiving the caption request select signal, a video parser 7 for receiving the video data outputted from the MPEG demultiplexer 1 and parsing it into user data and MPEG-2 data, a DTV caption reproducer 9 for outputting caption data by receiving the caption request select signal outputted from the user data and processor 11, a MPEG-2 video decoder 13 for outputting a program video by decoding the MPEG-2 data outputted from the video parser 7, a video synthesizer 15 for synthesizing the program video outputted from the MPEG video decoder 13 with the caption data outputted from the caption reproducer 9 in accordance with the GUI picture information outputted from the user graphic storing unit 17 and outputting a synthesized picture signal, and a video reproducer 19 for outputting the reproduced picture signal in order to reproduce the synthesized picture signal on the screen.

Herein, the user data means caption data (for example, English, French, German etc.).

Figure 2:
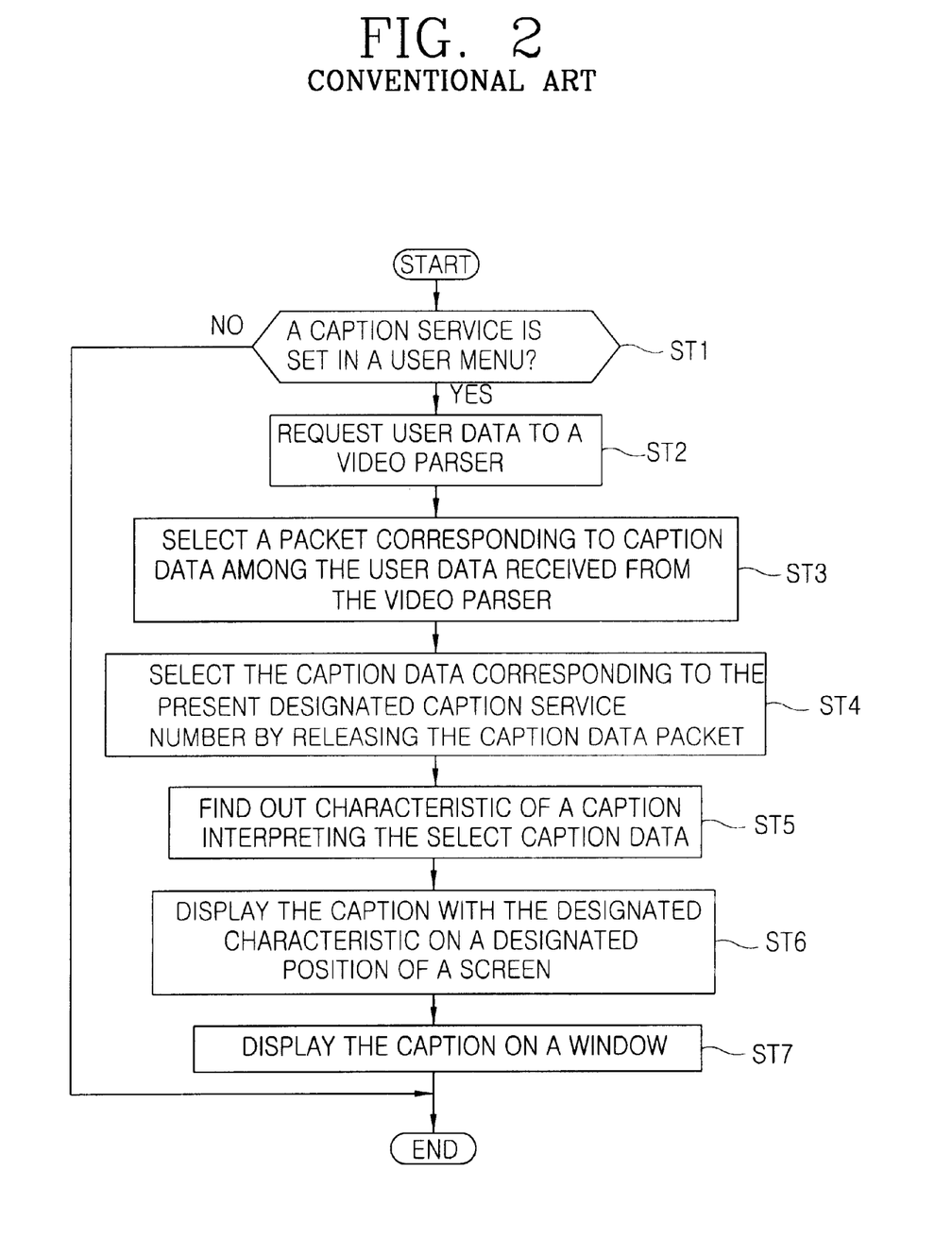
FIG. 2 is a flow chart illustrating a caption processing method in accordance with the conventional technology.

As depicted in FIG. 2, a caption processing method in accordance with the conventional technology will now be described with the operation of the above-described general caption processing apparatus.

When the user inputs the user order signal to the DTV through the remote controller, the processor 11 judges whether the caption output request is set on the caption menu in accordance with the caption output request of the user order signal in ST1. When it is set, the processor 11 requests the user data to the video parser 7 through the caption reproducer 9 in ST2. The caption reproducer 9 is inputted the packet corresponding to the caption outputted from the video parser 7 in ST3, and the caption reproducer 9 releases the packet of the caption data, and outputs the caption data corresponding to the present select caption output request in ST4.

The caption reproducer 9 analyzes the outputted caption data, and finds out all information related to width, height, and color of the caption about place and a certain reference point of the caption displayed on the screen in ST5, displays a caption window on a designated position of the screen in accordance with the information in ST6, and displays the caption on the caption window in ST7.

Figure 3:
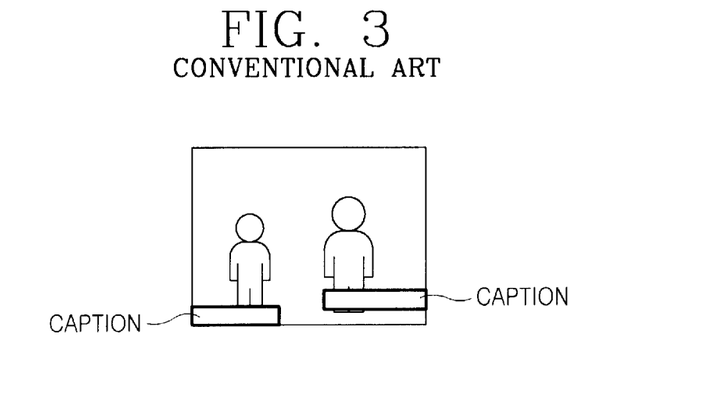
FIG. 3 illustrates a picture having 4:3 picture ratio displayed on a screen of a DTV.

As depicted in FIG. 3, the picture of the broadcast program broadcasted from the broadcast station has 4:3 picture ratio.

Accordingly, in order to display the picture of the broadcast program having 4:3 picture ratio on the screen of the DTV having 16:9 picture ratio, the picture of the broadcast program having the 4:3 picture ratio has to be compensated appropriately.

Figure 4A:
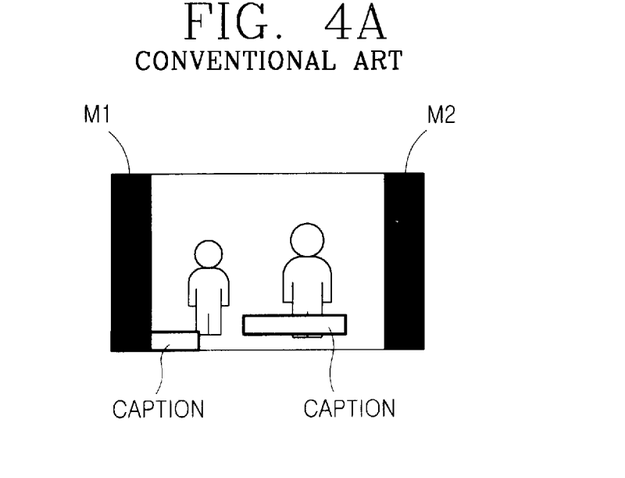
FIGS. 4A and 4B illustrate a caption crowded to one side on a screen of a DTV having 16:9 picture ratio.

FIG. 4A illustrates the picture having 4:3 picture ratio on the screen of the DTV having 16:9 picture ratio. The screen of the DTV having 16:9 picture ratio displays the picture having 4:3 picture ratio by receiving signals M1, M2 added to wide screen panel signals for a wide screen.

However, in the caption display method in accordance with the conventional technology, when the caption descriptor is not included in the data transmitted from the broadcast station, because the caption to be displayed on the DTV having 16:9 picture ratio can not be compensated, the caption (CAP) displayed on the screen of the DTV is displayed toward one side.

Figure 4B:
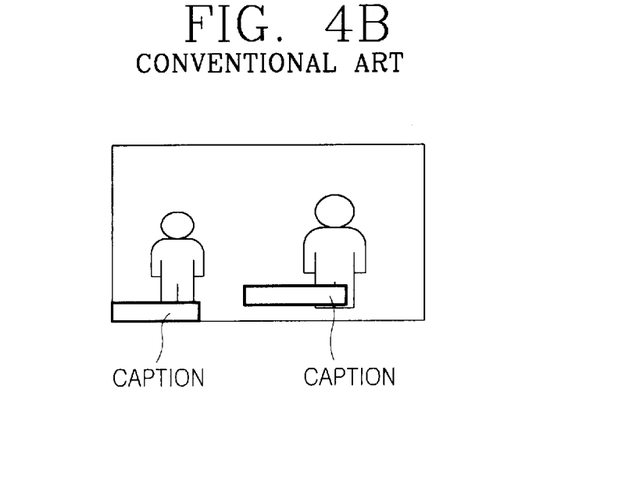

FIG. 4B illustrates the picture having 4:3 picture ratio which is displayed on the screen having 16:9 picture ratio by removing the side screen panel signals M1, M2.

As well as the slant problem of the caption of FIG. 4A, in the caption display method in accordance with the conventional technology, when the caption descriptor is not included in the data transmitted from the broadcast station, because the caption to be displayed on the screen of the DTV having 16:9 picture ratio can not be compensated, the caption (CAP) displayed on the screen of the DTV is displayed toward one side.

SUMMARY OF THE INVENTION

An object of the present invention is to provide a caption display method of a digital television which is capable of displaying caption after compensating the position and font of a picture corresponding to the picture ratio of a receiver regardless of a picture ratio of a broadcast program transmitted from a broadcast station.

Another object of the present invention is to provide a caption display method of a digital television which is capable of displaying a caption having a certain size and a font on an appropriate position of a picture having 16:9 picture ratio when a picture having 4:3 picture ratio or a picture having 16:9 picture ratio enlarged from the picture having 4:3 picture ratio is displayed on a screen of a digital television having 16:9 picture ratio.

In order to achieve the above-mentioned and other objects, the caption display method of the digital television in accordance with the present invention for displaying a picture with a caption by receiving a picture transmission stream transmitted from a broadcast station on a screen of a DTV having a certain picture ratio comprises a judging process for judging whether a caption descriptor is included in program system information protocol transmitted with the picture transmission stream, an adjusting process for adjusting automatically font and/or position of a caption to be displayed with a picture of the received picture transmission stream in order to be displayed corresponding to the picture ratio of the screen in accordance with the information included in a caption descriptor when there is the caption descriptor, and a displaying process for displaying a caption having the adjusted font on the adjusted position with the picture.

In order to achieve the above-mentioned and other object, a caption display method of a digital television in accordance with the present invention for displaying a caption with a picture by receiving the picture having 4:3 picture ratio or having 16:9 picture ratio enlarged from 4:3 picture ratio or having 16:9 picture ratio converted from 4:3 picture ratio by adding side signals on both sides from a broadcast station on a screen of a DTV having 16:9 picture ratio comprises a judging process for judging whether a caption descriptor is included in program system information protocol transmitted with the picture transmission stream, an adjusting process for adjusting automatically font and/or position of a caption displayed with the picture of the received picture transmission stream, and a displaying process for displaying a caption having the adjusted font on the adjusted position with the picture.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

The present invention relates to a caption display method of a DTV which is capable of displaying a caption having a certain size and a font on an appropriate position of a screen having 16:9 picture ratio when the picture having 4:3 picture ratio or 16:9 picture ratio enlarged from the 4:3 picture ratio is displayed on the screen of the DTV having 16:9 picture ratio, and it can be embodied in a general caption display apparatus of FIG. 1.

Figure 5A:
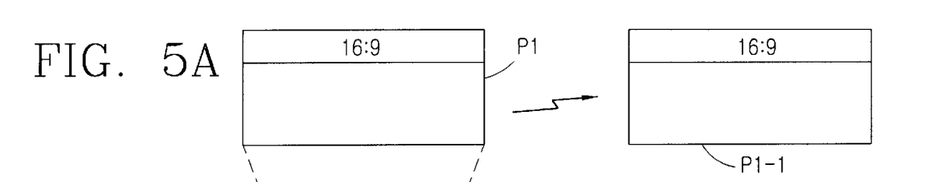
FIGS. 5A~5C illustrate pictures displayed on screens in order to describe a caption processing method in accordance with the present invention.
Figure 5B:
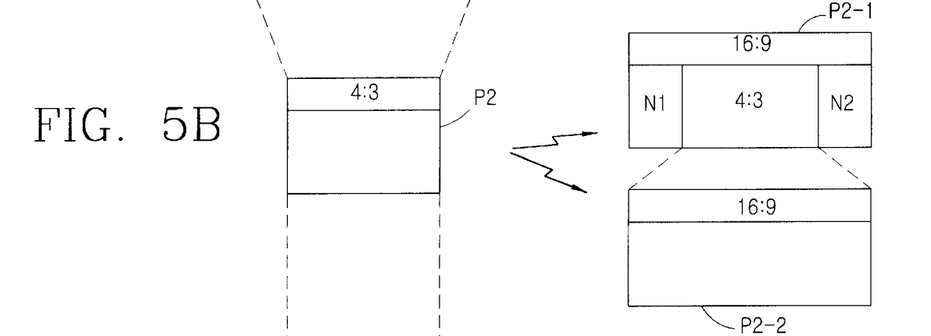
Figure 5C:
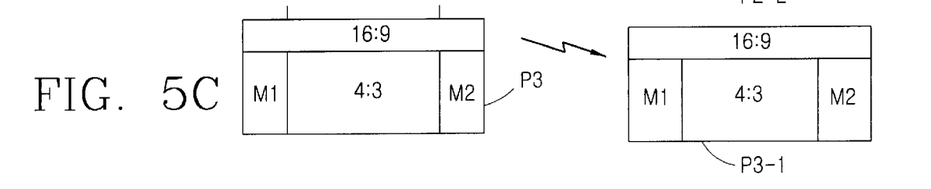

FIGS. 5A~5C illustrate pictures displayed on screens in order to describe a caption processing method in accordance with the present invention.

A broadcast station broadcasts a picture P2 having 4:3 picture ratio to a DTV as depicted in FIG. 5B or broadcasts a picture P1 having 16:9 picture ratio enlarged from 4:3 picture ratio as depicted in FIG. 5A or broadcasts a picture P3 having 16:9 picture ratio converted from 4:3 picture ratio by adding side signals.

Then, as depicted in FIG. 5A, when the DTV receives the picture P1 having enlarged 16:9 picture ratio, it outputs the enlarged picture P1-1 having 16:9 picture ratio on a screen as it is.

In addition, as depicted in FIG. 5B, when the DTV receives the picture P2 having 4:3 picture ratio, it outputs a picture P2-1 having 4:3 picture ratio with the side signals N1, N2 added thereto or outputs a picture P2-2 having enlarged 16:9 picture ratio by enlarging the picture having 4:3 picture ratio.

In addition, as depicted in FIG. 5C, when the DTV receives the picture P3 having 16:9 picture ratio with the side signals M1, M2 added thereto, it outputs the picture P3-1 having 16:9 picture ratio with the added side signals M1, M2 as it is.

As described above, when pictures having various picture ratios are transmitted from the broadcast station to the DTV, the DTV has to display captions transmitted together with the pictures having the various picture ratios. In other words, when the picture having 4:3 picture ratio is displayed on the screen of the DTV having 16:9 picture ratio, the caption has to be displayed on an appropriate position without being crowded to one side, accordingly the captions displayed on the pictures having 16:9 picture ratio and 4:3 picture ratio have to be defined.

First, in order to display a picture transmitted from the broadcast station on a screen appropriately, the caption processing method in accordance with the present invention defines a standard font and a large font, and processes a caption automatically or manually according to whether a caption descriptor is included in the picture stream transmitted from the broadcast station or not.

Figure 6A:
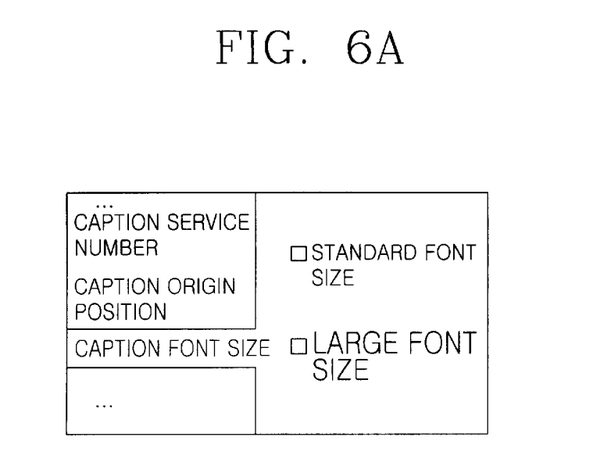
FIG. 6A illustrates a caption menu for selecting a caption font size in accordance with the present invention.

FIG. 6A illustrates a caption menu for selecting a caption font size in accordance with the present invention. When the caption descriptor is not included in a PMT or an EIT of the picture transmission stream transmitted from the broadcast station, the standard font or large font is selected by a user order input mean such as a remote controller etc., and is displayed on the screen.

Figure 6B:
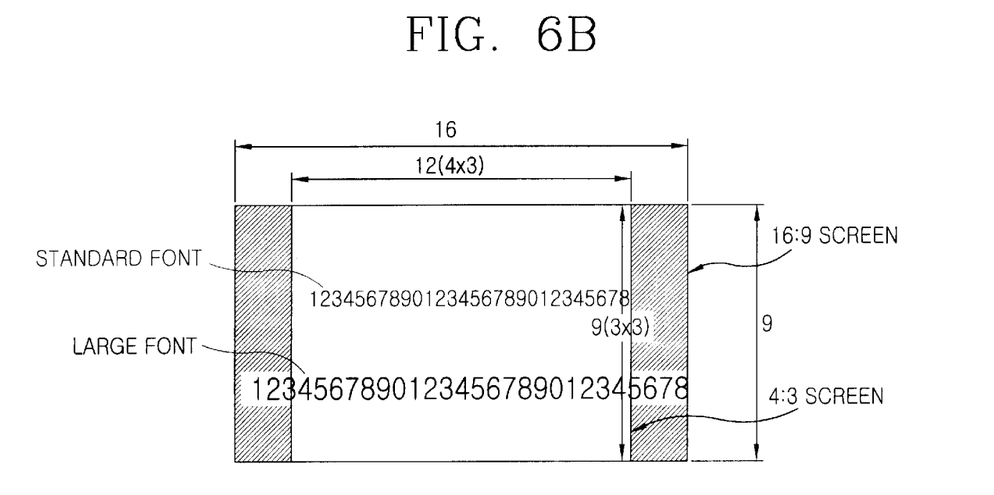
FIG. 6B illustrates caption font corresponding to picture ratio of a picture in accordance with the present invention.

FIG. 6B illustrates caption font corresponding to picture ratio of a picture in accordance with the present invention.

As depicted in FIG. 6B, because the picture width (16:9) where the large font is displayed is about 1.3 (16/12) times larger than the 4:3 picture width, the character width of the large font in accordance with the present invention is embodied so as to be about 1.3 times larger than the character width of the standard font.

Herein, as depicted in P2-2 of FIG. 5B, when the picture having 16:9 picture ratio enlarged from 4:3 picture ratio is displayed on the screen of the DTV, the caption of the large font is displayed with the picture having enlarged 16:9 picture ratio, and the standard font is displayed with the picture when pictures excluding the large font display are displayed on the screen.

Meanwhile, in a caption displayed on the screen by placing on an appropriate position of the picture, a caption origin has to be defined.

Figure 7:
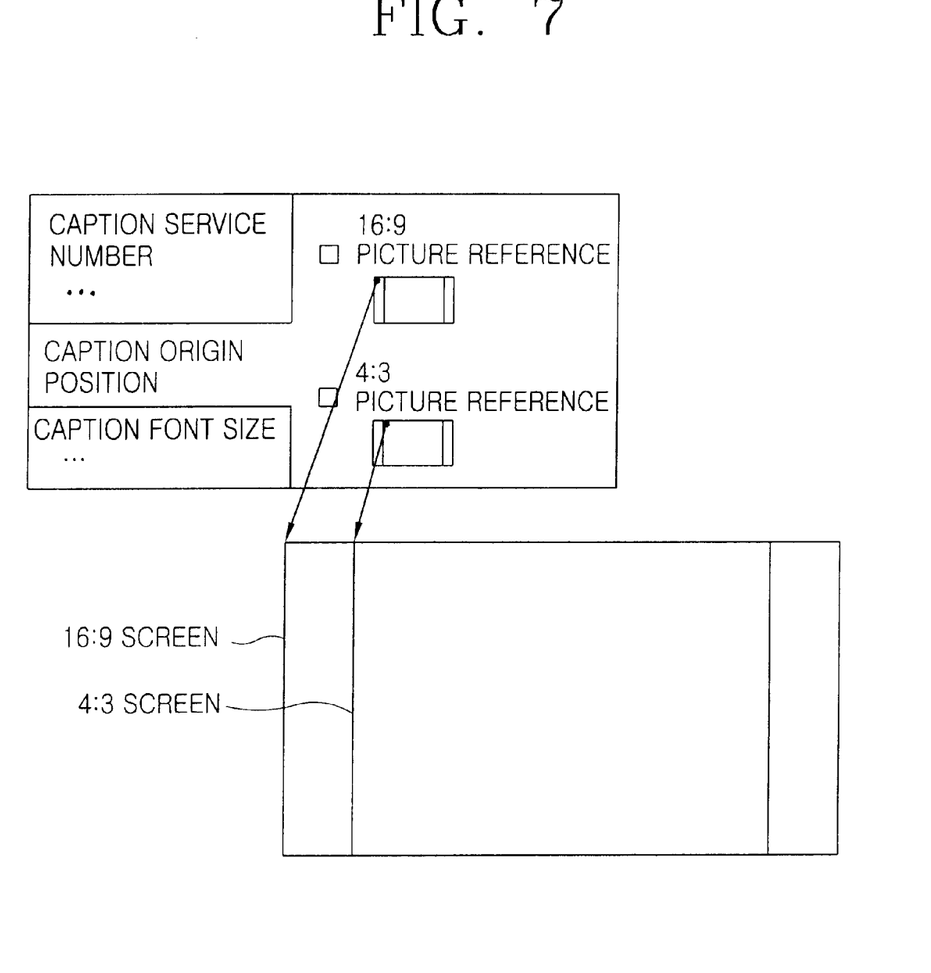
FIG. 7 illustrates a caption menu for selecting a caption origin in accordance with the present invention.

FIG. 7 illustrates a caption menu for selecting a caption origin in accordance with the present invention. The caption is displayed on the screen without being crowded to one side by selecting the picture 4:3 picture ratio and the picture having 16:9 picture ratio corresponding to the screen ratio of the DTV.

When the pictures P1, P3 having 16:9 picture ratio and the caption descriptor information transmitted together with them are the picture reference having 16:9 picture ratio as depicted in FIGS. 5A and 5C or when the picture P2 having 4:3 picture ratio and the caption descriptor information transmitted together with the picture are the picture reference having 4:3 picture ratio as depicted in FIG. 5B, a caption position is displayed by setting an origin position of the caption automatically from the reference of the each pertinent picture (P1-1, P2-1, P3-1). In other words, when the picture having 4:3 ratio or 16:9 ratio and the caption descriptor information of it are set as the reference of 4:3 ratio picture or the reference of 16:9 ratio picture, the caption is displayed on the screen by setting automatically the caption origin with an OFFSET value (ORG_OFFSET) set in advance.

Meanwhile, as depicted in FIG. 5A, when the picture P1 having 16:9 picture ratio enlarged from 4:3 picture ratio is received, the caption can be displayed on an accurate position of the screen by setting manually the caption font into the standard font by a user.

In addition, as depicted in FIG. 5C, when the picture P3 having 16:9 picture ratio with the added side signals M1, M2 on the left and right side of the picture having 4:3 picture ratio from the broadcast station is received, as depicted in FIG. 7, the caption is displayed as the standard font on an appropriate position of the picture P3-1 having 16:9 picture ratio enlarged from the picture P3-1 having 4:3 picture ratio with the added side signals by setting manually the caption origin position by the user so as to be displayed on the picture having 4:3 picture ratio.

In addition, as depicted in FIG. 5B, when the picture P2-1 having 4:3 picture ratio with added the added side signals N1, N2 on the left and right is displayed, as depicted in FIG. 7, the caption is displayed by setting a caption position and a standard caption font. When the received picture P2-2 having 16:9 picture ratio enlarged from 4:3 picture ratio is displayed on the screen, the user sets the caption font as the large font and sets the caption position compensation value as "0". Accordingly, the pertinent caption is displayed on the screen by placing on the appropriate position of the picture.

The caption processing method of the DTV in accordance with the present invention will now be descried as below.

Figure 8:
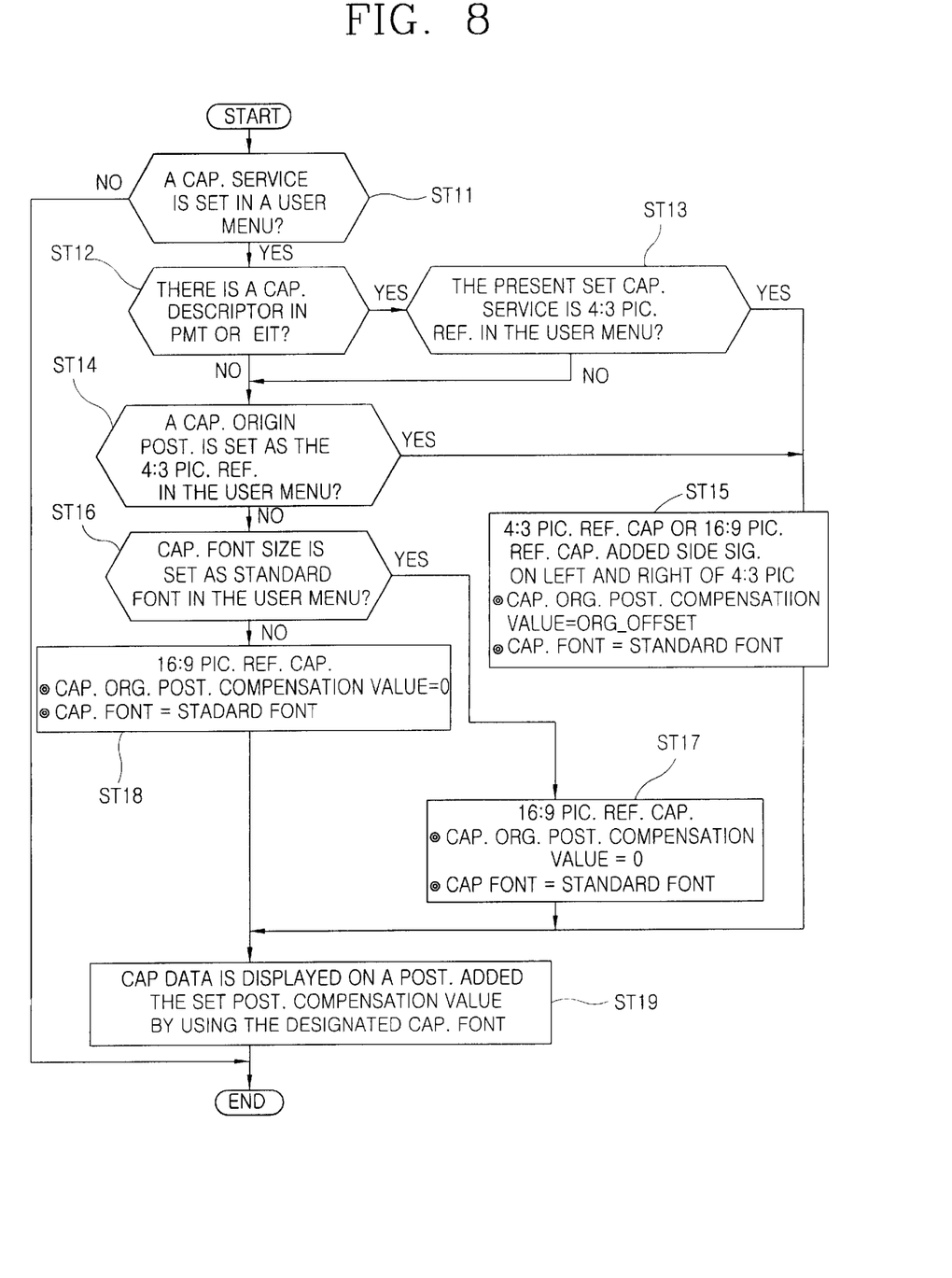
FIG. 8 is a flow chart illustrating a caption processing method of a DTV in accordance with the present invention.

FIG. 8 is a flow chart illustrating a caption processing method of a DTV in accordance with the present invention. The processor judges whether a caption output request is set in the user menu in ST11. When the caption output menu is set, it judges whether the caption descriptor information is included in the PMT or EIT in ST12. When the caption descriptor information is included in the PMT or EIT, it judges whether the present caption output request information is set as the picture reference having 4:3 picture ratio in ST13.

Meanwhile, when the caption output request is not set in S11, the caption having a certain size font placed on the appropriate position of the picture is displayed in accordance with the type of the caption.

When the caption output request is not set as the 4:3 picture ratio picture reference or the caption descriptor information is not included in the PMT or EIT, it is manually judged whether the caption origin position is set on the basis of the 4:3 picture ratio picture reference in the user menu in ST14.

Figure 9A:
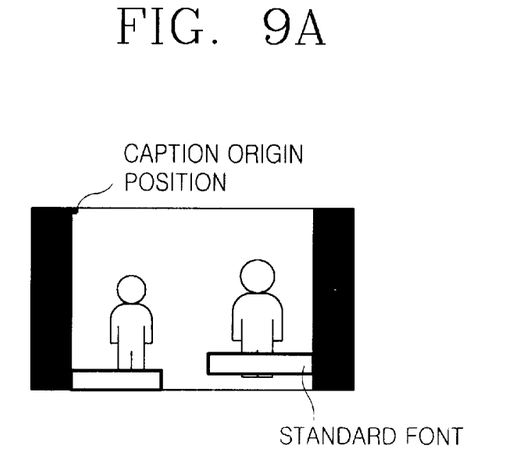
FIGS. 9A~9C illustrate a picture having 4:3 picture ratio with a caption displayed on a screen of a DTV having 16:9 picture ratio in accordance with the present invention.
Figure 9B:
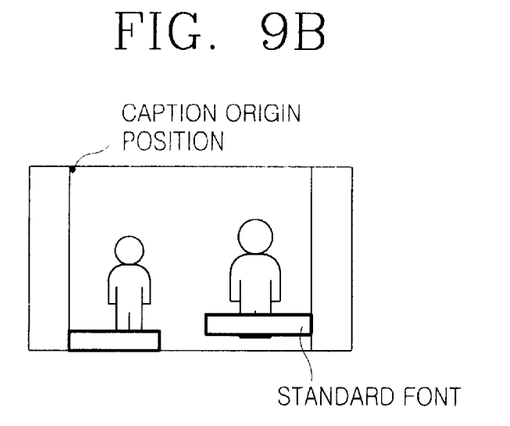

When it is set as the 4:3 picture ratio picture reference or the present caption output request is set on the basis of the 4:3 picture ratio picture reference, it is determined to be the 4:3 picture ratio picture reference caption or 16:9 picture ratio reference caption with the added side signals on the left and right positions of the picture having 4:3 picture ratio, the offset value set in advance is selected as the caption origin compensation value, the standard font is selected as the caption font in S15 and accordingly, the caption is displayed by using the offset value and standard font as depicted in FIGS. 9A and 9B in ST19.

When the caption origin position is not set as the 4:3 picture ratio picture reference, but is set as the 16:9 picture ratio picture reference in ST14 it is judged whether the caption font size is set as the standard font in the user menu in ST16. When the standard font is set, it is determined to be the 16:9 picture ratio picture standard caption, and accordingly the caption origin compensation value is '0' and the caption font is the standard font in ST17, and the caption is displayed by using the standard font without compensating the caption origin position in ST19. In other words, because the picture having 16:9 picture ratio is received, the caption included in the picture is displayed as it is.

Figure 9C:
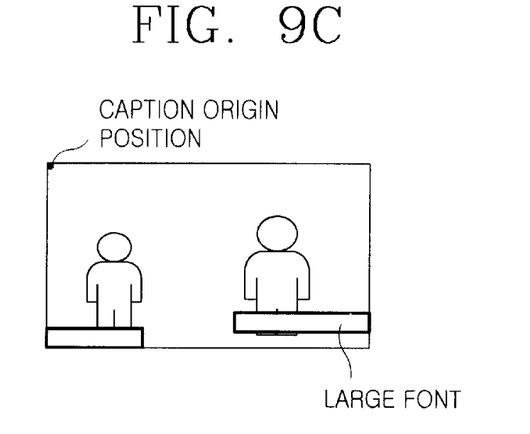

When the caption font size is not the standard font in the user menu in S16, it is the 16:9 picture ratio picture reference caption enlarged to left and right from the picture having 4:3 picture ratio, the caption origin position compensation value is '0' and the caption font is the large font set in advance by the user in ST18, as depicted in FIG. 9C. The large font, namely, the picture reference caption having enlarged 16:9 picture ratio is displayed in ST19.

As described above, when the picture having 4:3 picture ratio or the picture having converted 4:3 picture ratio is displayed on the screen having 16:9 picture ratio, the caption display method of the DTV in accordance with the present invention is capable of setting and displaying the caption automatically when the caption descriptor is included, and displaying the caption having appropriate font and size on an appropriate position of the picture in accordance with the type of the caption when the caption descriptor is not included.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A caption display method of a DTV for displaying a caption with a picture on a screen of a DTV having a certain picture ratio by receiving picture transmission stream transmitted from a broadcast station, comprising:

judging whether a caption descriptor is included in program system information protocol transmitted with the picture transmission stream;

adjusting automatically font and position of a caption to be displayed with the picture of the received picture transmission stream so as to be displayed corresponding to a picture ratio of a screen in accordance with information included in the caption descriptor when there is a caption descriptor; and displaying the caption having the adjusted font on the adjusted position with the picture, wherein the caption descriptor information comprises a picture ratio of a picture to be displayed on the screen.

2. The caption display method of the DTV according to claim 1, wherein the program system information protocol is a PMT and an EIT.

3. The caption display method of the DTV according to claim 1, wherein the picture ratio of the screen is 16:9.

4. The caption display method of the DTV according to claim 1, wherein the picture of the picture transmission stream is a picture having 4:3 picture ratio or having 16:9 picture ratio enlarged from the picture having 4:3 picture ratio or having 16:9 picture ratio converted from the picture having 4:3 picture ratio by adding side signals on both sides.

5. The caption display method of the DTV according to claim 1, wherein the displaying process generates a picture having 16:9 picture ratio by adding side signals when the received picture transmission stream is the picture having 4:3 picture ratio, and displays the generated picture having 16:9 picture ratio it on the screen.

6. The caption display method of the DTV according to claim 1, wherein the font of the caption is a standard font.

7. The caption display method of the DTV according to claim 1, wherein the picture ratio of the screen and the received picture are adjusted as a preset offset value in accordance with the picture ratio.

8. The caption display method of the DTV according to claim 1, wherein the judging process further comprises setting a caption output request in a user menu.

9. The caption display method of the DTV according to claim 1, further comprising:

adjusting manually the font and/or position of the caption to be displayed with the picture of the received picture transmission stream through a user menu when there is not caption descriptor included in the program guide information.

10. The caption display method of the DTV according to claim 9, wherein the program system information protocol is a PMT and an MT.

11. The caption display method of the DTV according to claim 9, wherein the caption descriptor information comprises a picture ratio of a picture to be displayed on the screen.

12. The caption display method of the DTV according to claim 9, wherein the picture ratio of the screen is 16:9.

13. The caption display method of the DTV according to claim 9, wherein the picture of the picture transmission stream is a picture having 4:3 or having 16:9 picture ratio enlarged from the picture having the 4:3 picture ratio or having 16:9 picture ratio converted from the picture having 4:3 picture ratio by adding side signals on both sides.

14. The caption display method of the DTV according to claim 9, wherein the displaying process displays a large font caption when a picture having the 16:9 picture ratio enlarged from a 4:3 picture ratio picture is displayed on the screen.

15. The caption display method of the DTV according to claim 9, wherein the displaying process displays the received picture as a picture having 16:9 picture ratio.

16. The caption display method of the DTV according to claim 9, wherein the font of the caption is a standard font.

17. The caption display method of the DTV according to claim 9, wherein the judging process further comprises setting a caption output request in the user menu.

18. A caption display method of a DTV for displaying a caption with a picture on a screen of a DTV having a certain picture ratio by receiving picture transmission stream transmitted from a broadcast station, comprising:

judging whether a caption descriptor is included in program system information protocol transmitted with the picture transmission stream;

adjusting automatically font and position of a caption to be displayed with the picture of the received picture transmission stream so as to be displayed corresponding to a picture ratio of a screen in accordance with information included in the caption descriptor when there is a caption descriptor;

displaying the caption having the adjusted font on the adjusted position with the picture; and adjusting manually the font and/or position of the caption to be displayed with the picture of the received picture transmission stream through a user menu when there is no caption descriptor included in the program guide information, wherein the caption descriptor information comprises a picture ratio of a picture to be displayed on the screen.

19. A caption display method of a DTV for displaying a caption with a picture on a screen of a DTV having a certain picture ratio by receiving picture transmission stream transmitted from a broadcast station, comprising:

judging whether a caption descriptor is included in program system information protocol transmitted with the picture transmission stream;

adjusting automatically font or position of a caption to be displayed with the picture of the received picture transmission stream so as to be displayed corresponding to a picture ratio of a screen in accordance with information included in the caption descriptor when there is a caption descriptor; and displaying the caption having the adjusted font or position with the picture, wherein the caption descriptor information comprises a picture ratio of a picture to be displayed on the screen.

* * * * *